United States Patent
Banerjee (10) Patent No.: US 8,631,458 B1
(45) Date of Patent: Jan. 14, 2014

(54) METHOD AND APPARATUS FOR ELASTIC (RE)ALLOCATION OF ENTERPRISE WORKLOADS ON CLOUDS WHILE MINIMIZING COMPLIANCE COSTS

(75) Inventor: Deb Banerjee, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 48 days.

(21) Appl. No.: 13/249,045

(22) Filed: Sep. 29, 2011

(51) Int. Cl.
*G06F 21/00* (2013.01)

(52) U.S. Cl.
USPC .................................. 726/1; 726/15; 718/1

(58) Field of Classification Search
None
See application file for complete search history.

(56) References Cited

U.S. PATENT DOCUMENTS

| | | | |
|---|---|---|---|
| 2005/0271996 A1* | 12/2005 | Sporbert et al. | 433/24 |
| 2009/0172773 A1* | 7/2009 | Moore | 726/1 |
| 2011/0243553 A1* | 10/2011 | Russell | 398/25 |
| 2012/0069131 A1* | 3/2012 | Abelow | 348/14.01 |
| 2012/0284408 A1* | 11/2012 | Dutta et al. | 709/226 |

OTHER PUBLICATIONS

Hines, "McAfee Unveils DLP Gateway," InfoWorld, Apr. 2007, pp. 1-2,(last retrieved Dec. 15, 2012 at http://www.infoworld.com/d/security-central/mcafee-unveils-dlp-gateway-760).*

* cited by examiner

*Primary Examiner* — Hadi Armouche
(74) *Attorney, Agent, or Firm* — Lowenstein Sandler LLP (57) ABSTRACT

A method and apparatus for elastic (re)allocation of enterprise workloads on clouds identifies a set of requirements for a workload. The workload includes one or more application running on a set of virtual machines. The requirements are defined by a set of compliance standards. The method and apparatus compares the set of requirements with a set of controls installed for various virtual infrastructure elements in at least one cloud. The method and apparatus selects virtual infrastructure elements satisfying a minimum cost criterion for placement of the set of virtual machines for the workload. The virtual infrastructure elements can include one or more hosts, one or more network devices, and/or one or more storage devices. The method and apparatus deploy the set of virtual machines for the workload on the selected virtual infrastructure elements.

20 Claims, 6 Drawing Sheets

ID APPARATUS FOR ELASTIC
METHOD AND APPARATUS FOR ELASTIC (RE)ALLOCATION OF ENTERPRISE WORKLOADS ON CLOUDS WHILE MINIMIZING COMPLIANCE COSTS

FIELD

The method and apparatus described below relate to distributed computing. More specifically, the claimed method and apparatus is directed to elastic (re)allocation of enterprise workloads on clouds while minimizing compliance costs.

BACKGROUND

A workload generally refers to one or more applications running on a set of virtual machines wherein in a set may be one or more virtual machines. The attributes of a workload typically include availability, security and resource requirements. Allocation of a workload refers to a mapping of virtual machine (VM) instances that contain applications associated with a collection of hosts on a variety of networks. Currently, workload allocation does not consider compliance costs. With the introduction of new or additional cloud infrastructure assets, enterprises remain responsible for ensuring that application workloads remain in compliance with the appropriate regulations and standards. Enforcing compliance increases the burden of security administrators to deploy the appropriate set of controls at the appropriate physical and virtual infrastructure elements including computer hosts, networks and storage. Some compliance regulations may require deploying a set of controls at the platform, infrastructure and service levels.

Without control awareness, the cost to reallocate and/or scale a given workload is unpredictable. This unpredictability stifles the optimization of virtual data centers by means of moving workloads since regulations may require administrators to allocate a given workload to a virtual infrastructure element that implements security controls corresponding to the standards associated with the given workload. Since the management of these controls may be distributed through a variety of mechanisms, there is a need to automate and maintain a control deployment framework that is conscious of the set of controls associated with a given set of compliance regulations or standards.

SUMMARY

To reduce the cost of deploying controls over a heterogeneous infrastructure, the method and apparatus described below advantageously maps controls for workloads into one or more cloud infrastructure assets. A method for elastic (re)allocation of enterprise workloads on clouds may include identifying a set of requirements for a workload. According to one embodiment, the workload comprises one or more applications running on a set of virtual machines and the requirements are specified by a set of compliance standards. The method may further include comparing the set of requirements with a set of controls installed for various virtual infrastructure elements in at least one cloud and selecting virtual infrastructure elements satisfying a minimum cost criterion for placement of the set of virtual machines for the workload. The virtual infrastructure elements can include one or more host, one or more network devices, and/or one or more storage devices. In one embodiment, elastic (re)allocation may include deploying the set of virtual machines for the workload on the selected virtual infrastructure elements.

An exemplary system may include a memory and a processing device coupled to the memory. The system may identify a set of requirements for a workload, wherein the workload comprises one or more applications running on a set of virtual machines and the requirements are defined by a set of compliance standards. The set of virtual machines comprising one or more virtual machines. The system may further compare the set of requirements with a set of controls installed for various virtual infrastructure elements in one or more clouds and select virtual infrastructure elements satisfying a minimum cost criterion for placement of the set of virtual machines for the workload. The virtual infrastructure elements can include one or more host, one or more network devices, and/or one or more storage devices. In one embodiment, the system may deploy the set of virtual machines for the workload on the selected virtual infrastructure elements.

Elastic (re)allocation of enterprise workloads may also be programmed on a computer readable medium. A computer readable medium may include instructions that, when executed by a processor, cause the processor to identify a set of requirements for a workload, wherein the workload comprises one or more applications running on a virtual machine and the requirements are defined by a set of compliance standards. The computer readable medium may further include instructions to compare the set of requirements with a set of controls installed for various virtual infrastructure elements in one or more one clouds and select virtual infrastructure elements satisfying a minimum cost criterion for placement of the set of virtual machines for the workload. The virtual infrastructure elements can include one or more host, one or more network devices, and/or one or more storage devices. The computer readable medium may further include instructions to deploy the set of virtual machines for the workload on the selected virtual infrastructure elements.

BRIEF DESCRIPTION OF THE DRAWINGS

In the following description, reference is made to the accompanying drawings that form a part hereof, and is shown by way of illustration specific embodiments in which the invention may be practiced. It is to be understood that other embodiments may be utilized and structural changes may be made without departing from the scope of the present invention.

DETAILED DESCRIPTION

A method and apparatus for elastic (re)allocation of enterprise workloads on clouds identifies a set of requirements for a workload and compares the set of requirements with a set of controls installed for various virtual infrastructure elements in at least one cloud. The method and apparatus may select virtual infrastructure elements satisfying a minimum cost criterion for placement of the set of virtual machines. The virtual infrastructure elements can include one or more hosts, one or more network devices, and/or one or more storage devices. The method and apparatus deploys the set of virtual machines on the selected virtual infrastructure elements.

Clouds allow workloads to be allocated on-demand, reallocated based on scalability, availability and/or data center utilization requirements. A workload may be reallocated from one or more virtual infrastructure elements to one or more destination virtual structure elements. Examples of virtual infrastructure elements can include, and are not limited to hosts, network devices, and storage devices. The one or more destination virtual infrastructure elements may reside on private cloud, public cloud or a combination of both clouds. One of the advantageous aspects of the method and apparatus described below is the mapping of controls associated with a given workload to one or more destination virtual infrastructure elements. This mapping minimizes the compliance costs of reallocating a workload from one virtual infrastructure elements to other virtual infrastructure elements because the mapping of controls provides control awareness. The ability to select a virtual infrastructure element (e.g., hosts, network devices, storage devices) with a set of controls in scope of a regulation reduces the burden to deploy additional controls after allocating the workload.

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
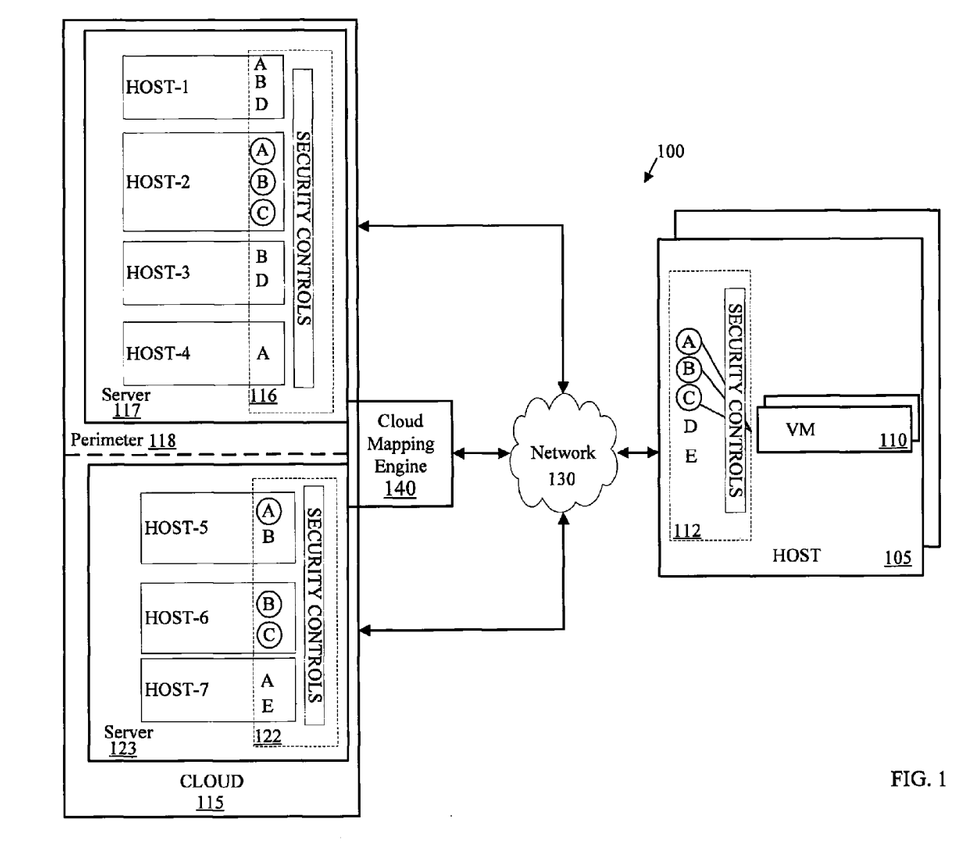
FIG. 1 illustrates one embodiment of a network architecture in which the method and apparatus for elastic (re)allocation of enterprise workloads on clouds may operate.

FIG. 1 illustrates one embodiment of a network architecture in which the method and apparatus for elastic (re)allocation of enterprise workloads on clouds may operate. The network architecture 100 may include virtual infrastructure elements. Examples of virtual infrastructure elements can include, and are not limited to hosts, network elements (e.g., switches, routers, virtual network devices, virtual firewalls), storage devices, hypervisors. For example, network architecture 100 can include one or more hosts 105 running one or more virtual machines 110 wherein the virtual machines include a set of associated security controls 112. The network 130 can include one or more network devices. The hosts 1-7 can be coupled to one or more storage devices. The host 105 may be in communication with a cloud 115 comprising one or more hosts over a network 130. As illustrated in FIG. 1, the one or more hosts in the cloud 115 may include a set of associated security controls 116 and 122. In one embodiment, the one or more hosts in the cloud 115 may reside in or be associated with one or more servers 117 and 123. The one or more hosts in cloud 115 may further include a logical or physical perimeter 118. As illustrated in FIG. 1, the network architecture 100 may include a cloud mapping engine 140 which minimizes compliance costs during elastic (re)allocation of enterprise workloads.

A host 105 or host computer may be implemented as an enterprise level computer virtualization server. The enterprise virtualization server includes a bare-metal embedded hypervisor running on server hardware. A hypervisor manages access to the hardware resources by guest operating systems concurrently running on the host computer. Server hardware may include one or more hard drives, a processor and/or other memory, e.g., Random Access Memory (RAM), Read Only Memory (ROM), cache memory and/or the like. The embedded hypervisor may communicate directly with the server hardware through a hardware interface, e.g., a vmkernel. In one embodiment, a host hypervisor manages the allocation of server hardware to one or more virtual machines and their associated workloads.

A virtual machine 110 may be understood as an isolated software program running its own operating system as if it were a physical computer. The virtual machine may include a software based central processing unit, a random access memory hard drive and a network interface card. In one embodiment, the virtual machine may run a workload or one or more software applications, e.g., an e-mail application, a database application, a filtering application, a storage application and/or the like. The host hypervisor may advantageously manage a plurality of virtual machines running different operating systems on a single host computer, although more than one host computer may be used. As FIG. 1 illustrates, the virtual machine 110 may include a set of security controls 112. The virtual infrastructure elements (e.g., hosts, network devices, storage devices) in the network architecture 100 can include a set of security controls 112. For example, FIG. 1 further illustrates a cloud 115 environment with a set of hosts 1-7 and their associated security controls 116 and 122. Virtual infrastructure elements are also referred to as virtual infrastructure assets.

For example, the set of security controls 112, 116, 122 are illustrated as A, B, C, D and E. The security controls 112 may include a set of requirements for host 105 running the workload of a virtual machine 110. The set of controls or requirements may include specifications of software and/or hardware controls to achieve compliance with regulatory, legislative, industry and/or internal business standards. In one embodiment, security control A may refer to a set of specified software and hardware controls to achieve compliance with the Payment Card Industry standards, e.g., the data security standard PCI-DSS and the payment application data security standard, PA-DSS. In one embodiment, security control B may refer to the set of controls specified by the International Organization for Standards (ISO), e.g., ISO-27001. Security control C may refer to the set of controls specified by Health Insurance Portability and Accountability Act (HIPPA). Security control D may refer to the set of controls specified by the Gramm-Leahy-Billey Act (GLBA). Security control E may refer to controls specified by the Sarbanes-Oxley Act (SOX).

In one embodiment, the set of requirements of security control A may specify a firewall configuration, encryption, anti-virus protection, log management, activity monitoring and hardened access control measures including restrictive physical access to servers and enhanced account authentication, network monitoring and auditing procedures. In one embodiment, the set of requirements of security controls A-E may further identify the nature of the dataset to be secured. For example, the set of requirements may specify how credit cardholder information, medical records and/or financial records are secured. As illustrated in FIG. 1, the security controls 112 may be mapped to the set of security controls 116 and 122 by a cloud mapping engine 140 over the network 130.

A network 130 may include a set of nodes and/or network interfaces that accept, communicate, and/or connect to a communications network. Over the communications network, the virtual machine is accessible through network interfaces on remote clients by a user. For example, a network interface may include a telnet command line, a graphical user interface native to a client, a web application and/or the like. Network interfaces allow users to employ connection protocols such as, but not limited to, TCP/IP, IPSec, UDP, WAP, GSM and/or the like, to send data packets over Ethernet, Gigabit Ethernet, Fiber Optics, and wireless protocols, such as IEEE 802.11a-x, BLUETOOTH® and/or the like. A communications network may also be any one and/or the combination of a Local Area Network (LAN); a Metropolitan Area Network (MAN); and a Wide Area Network (WAN). Further, multiple network interfaces may be used to engage with various communications network types. For example, multiple network interfaces may be employed to allow for the communication over broadcast, multicast, and/or unicast networks. As illustrated in FIG. 1, the network 130 may place the virtual machine 110 residing in host 105 in communication with a cloud 115.

A cloud 115 is a flexible, service-centric network model open to many permutations. Cloud formations may follow a general set of guidelines for initiating, implementing, maintaining and optimizing a cloud service. The cloud network model includes on-demand self service, broad network access, resource pooling, flexible scalability and metered service. On-demand self service allows a user to unilaterally provision computational resources such as server dedication and network storage automatically. Broad network access allows a user to run an application over heterogeneous thin or thick client platforms, e.g., cable, cellular and IP based platforms. Resource pooling allows users of the cloud network model to share physical and virtual resources. Flexible scalability allows a user to obtain additional computational resources as resource requests increase and to release control of computational resources when the resource requests decrease. Metered service allows for transparent optimization of storage, processing and bandwidth based on historical use.

As illustrated in FIG. 1, cloud 115 may include hosts 1-7 where hosts 1-4 may reside on server 117 and hosts 5-7 may reside on server 123. The cloud network model 115 may follow a cloud service model and a cloud deployment model. Cloud service models include Software as a Service (SaaS), Infrastructure as a Service (IaaS) and Platform as a Service (PaaS). A Software as a Service (SaaS) cloud hosts an application and associated data on one or more servers. The SaaS cloud application generally provides access to services through a thin client interface (e.g., a browser) and allows a user to customize the application by passing configuration options or parameters. A Platform as a Service (PaaS) cloud provides an integrated development environment to support the creation of user interfaces and web applications. Using a PaaS cloud, a user may deploy or manage a variety of web services including SaaS services. An Infrastructure as a Service (IaaS) cloud provides a user with the ability to provision processing resources, storage resources, and bandwidth and to configure operating systems, deploy applications and configure network security.

The cloud deployment model may take the form of a private cloud, a public cloud, a community cloud and/or a hybrid cloud. A private cloud is a cloud service (e.g., SaaS, PaaS, IaaS) managed by a single organization and may be on-site or off-site. A public cloud is a cloud service available to the general public. A community cloud is a cloud service shared by a defined group of users or organizations. A hybrid cloud is a composition of two or more distinct clouds (e.g., public and private) logically associated for application and data portability.

Hybrid clouds allow workloads to be allocated on demand, reallocated based on scalability, availability or data center utilization requirements. Reallocation may occur on a private cloud, a public cloud and/or a private/public cloud combination. As illustrated in FIG. 1, a cloud 115 may have a logical or physical perimeter 118 separating one or more hosts.

Figure 2:
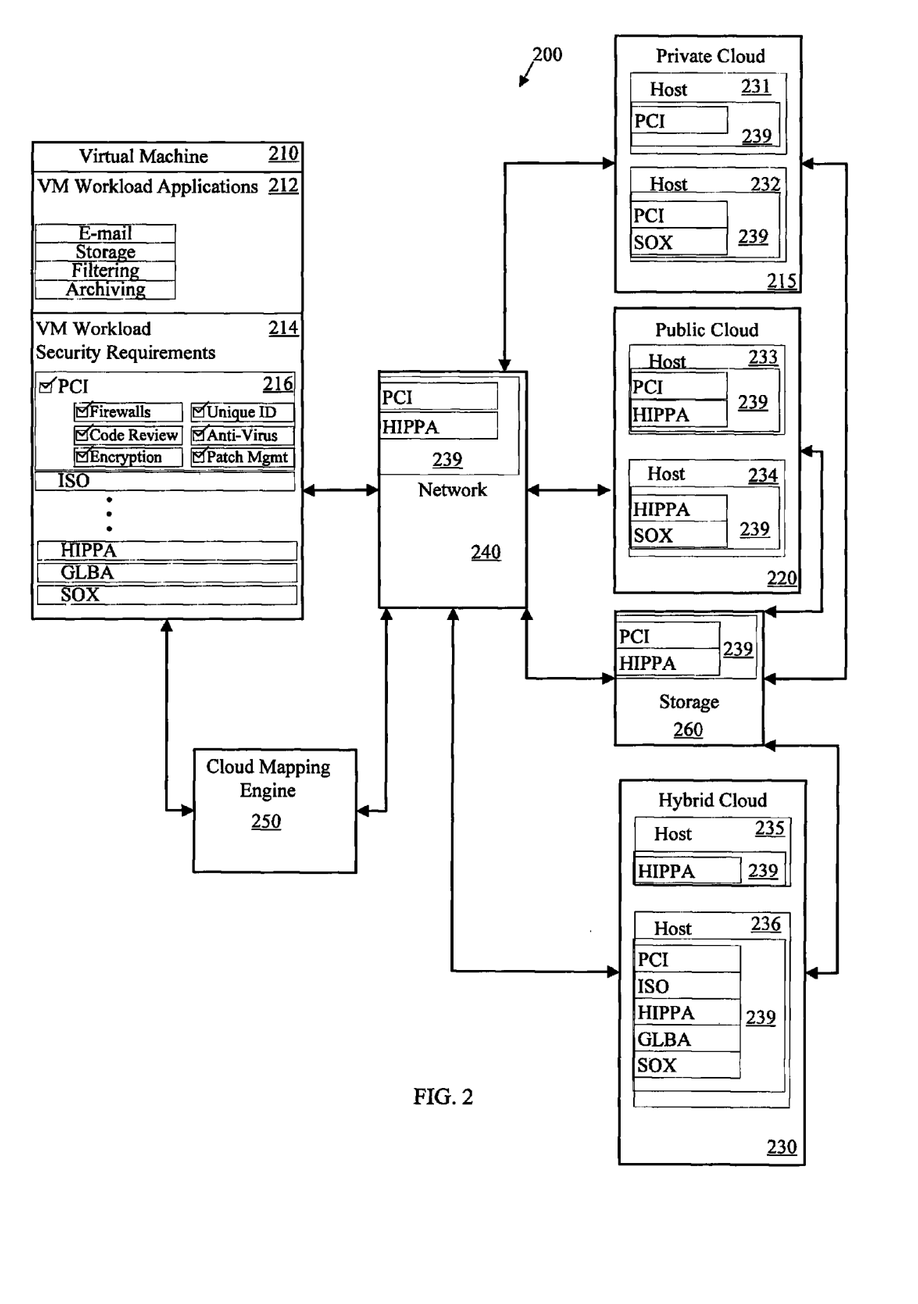
FIG. 2 illustrates one embodiment of a network architecture in which the method and apparatus for elastic (re)allocation of enterprise workloads on clouds may operate.

FIG. 2 illustrates one embodiment of a software architecture in which the method and apparatus for elastic (re)allocation of enterprise workloads on clouds may operate. The software architecture 200 of FIG. 2 may include a virtual machine 210, a private cloud 215, a public cloud 220, a hybrid cloud 220, a communications network 240, a cloud mapping engine 250 and one or more storage devices 260. The cloud mapping engine 250 may be the same as the cloud mapping engine 140 of FIG. 1. The virtual machine may include one or more VM workload applications 212, one or more VM workload security requirements 214, one or more sets of controls associated with a regulation 216, e.g., PCI. A cloud 215, 220, 230 can include one or more hosts coupled to one or more storage devices 260. The hosts and the storage devices can include one or more sets of controls 239. For example, cloud 215 may include a host 231 with at least one set of controls 239 in-scope of a regulation, e.g. PCI. Cloud 215 may also include a host 232 with one or more sets of controls 239 in scope of one or more regulations, e.g., PCI and SOX. Public cloud 220 may include one or more hosts 233, 234 with one or more sets of controls 239 specified by one or more regulations, e.g., PCI, HIPPA and/or SOX. Hybrid cloud 230 may include one or more hosts 235, 236 implementing controls specified by one or more regulations, e.g., HIPPA, PCI, ISO, GLBA and/or SOX.

As illustrated in FIG. 2, a virtual machine may include a set of VM workload applications 212, such as, e-mail, data and business applications, storage, filtering, archiving and/or the like. The VM workload security requirements 214 may include a set of controls, generally referenced in FIG. 1 as security controls A-E, 112, 116 and 122. For example, the set of controls 216 may include a firewall, code review, encryption, anti-virus, unique ID and patch management. A VM workload is in-scope of a compliance regulation when the VM is processing data that is in-scope of the regulations. For example, as illustrated in FIG. 1, a VM workload is in-scope of a compliance regulation when the VM is processing data that is in-scope of the regulations such as Credit card data for PCI-DSS. In one embodiment, compliance requires that controls specified by the regulation are successfully implemented for that application as necessary on the virtual infrastructure elements (e.g., hosts, network devices and storage devices). One of the advantageous aspects of the method for elastic (re)allocation is mapping the set of controls for an existing workload to a set of controls configured for a variety of hosts existing on one or more destination hosts. Mapping these workloads in an optimized fashion requires awareness of which controls are deployed in which part of the virtual infrastructure (computer, networks and storage). With this control awareness, the cost of reallocating or scaling workloads onto a destination virtual infrastructure elements (e.g., hosts, network devices, storage devices) may be estimated and ultimately minimized through the selection of virtual infrastructure elements exhibiting a set of controls that match the controls associated with the workload being (re)allocated.

The cloud mapping engine 250 identifies and keeps track of the controls required for a given workload. In one embodiment, the cloud mapping engine may tag workloads with a regulation attribute identifying the compliance regulation it is in scope of. For example, a virtual machine may be tagged PCI since it is in-scope of that regulation. The control mapping engine may also identify and tag controls (e.g., firewall, encryption, anti-virus, etc. . . . ) that may satisfy compliance regulations for that workload. In one embodiment, the control mapping engine may tag virtual infrastructure assets (e.g., hosts, hypervisors, storage devices, switches, routers, virtual network devices) with a list of controls deployed on them.

The cloud mapping engine may maintain a list of controls required for the given workload and a list of controls deployed on infrastructure assets, where the virtual machine is allocated. The list of controls can be stored as one or more data structures (e.g., a file, an array, a linked list). In one embodiment, the virtual infrastructure communicates a reallocation command to start the identification of available destination hosts a given workload (and the associated virtual machines) may be redeployed to. As illustrated in FIG. 2, one or more hosts 231, 232 on private cloud 215 may have a set of installed controls specified by the PCI regulation. In one embodiment, public cloud 220 comprises one or more hosts 233 including a set of controls in-scope of the PCI regulation. Hybrid cloud 230 also illustrates one or more hosts 236 specified by the PCI regulation. In one embodiment, the cloud mapping engine may store a survey of the existing assets and their associated controls in one or more files, a database and/or the like. The cloud mapping engine may use the survey information to determine a compliance cost for moving a workload residing on one host to a destination host residing on a private, public or hybrid cloud.

A network 240 may include the network described in FIG. 1. In one embodiment, network 240 includes one or more network devices and virtual network devices, which include a set of controls 239 satisfying one or more regulation and/or compliance standards, e.g., PCI and HIPPA. A storage device 260 may include any suitable storage device, storage server and/or storage service. Storage device 260 may also have a set of controls 239 satisfying one or more regulation and/or compliance standards, e.g., PCI and HIPPA.

Figure 3:
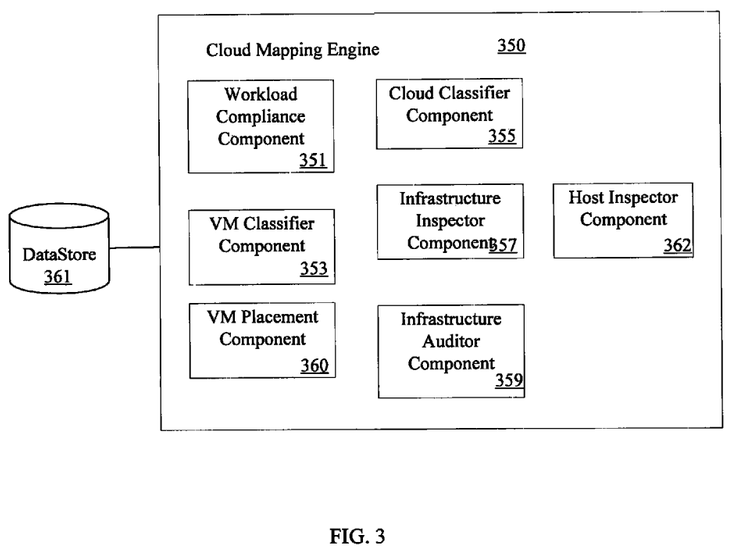
FIG. 3 illustrates a block diagram of one embodiment of a cloud mapping engine for elastic (re)allocation of enterprise workloads on clouds.

FIG. 3 illustrates a block diagram of one embodiment of a cloud mapping engine for elastic (re)allocation of enterprise workloads on clouds. As illustrated in FIG. 3, the cloud mapping engine 350 may include a workload compliance component 351, a VM classifier component 353, a cloud classifier component 355, an infrastructure (e.g., hosts, network devices, storage devices) inspector component 357, an infrastructure (e.g., hosts, network devices, storage devices) auditor component 359, a VM placement component 360, host inspector component 362, and a data store 361.

The workload compliance component 351 ensures the physical and virtual infrastructure assets are in compliance with a specified standard or regulation. In one embodiment, the workload compliance component tags a workload with an attribute to identify one or more compliance regulations it is in scope of. The workload compliance component may tag a workload at deployment, on a predetermined periodic basis (e.g., daily, weekly, monthly, yearly) and/or on a continuous basis.

A VM classifier component 353 classifies a virtual machine and associated workloads. In one embodiment, a VM workload may be classified as a high trust workload and/or a low trust workload. The VM classifier component may further classify a VM workload by the standard or regulation it is in scope of, e.g., a VM identified as PCI compliant may be classified as a PCI VM. In one embodiment, an administrator may receive a VM classification and/or a VM workload classification as a classification parameter for workload segmentation.

The cloud classifier component 355 maintains visibility into infrastructure in the cloud that may be used to host enterprise application workloads. In one embodiment, the cloud classifier component may identify one or more destination virtual infrastructure elements (e.g., host, network device, storage device) for potential VM placement. The cloud classifier component may also identify and store a set of security controls associated with a given cloud formation. In one embodiment, the cloud classifier may calculate a virtual infrastructure element specific compliance cost (e.g., a host specific compliance cost, network device specific compliance cost, storage device specific compliance cost). The virtual infrastructure element specific compliance cost may include a review of the security controls on each virtual infrastructure element (e.g., host, network device, storage device) and identify which virtual infrastructure elements (e.g., host, network device, storage device) are in compliance with one or more compliance regulations. This calculation may be computed, at least in part, by the infrastructure inspector, the infrastructure auditor and other components.

A host inspector component 362 identifies a host, the workloads associated with the host and the associated controls. In one embodiment, the host inspector component inspects the security associated with a host hypervisor, host switch, host security appliances and firewalls. The host inspector component may store the inspection results for a particular host to a data store. An infrastructure inspector component 357 identifies virtual infrastructure elements, the workloads associated with the virtual infrastructure elements, and the associated controls. In one embodiment, the infrastructure inspector component inspects the security associated with the host, network device and/or storage device. The infrastructure inspector component may store the inspection results for a particular host to a data store.

An infrastructure auditor component 359 audits one or more virtual infrastructure elements (e.g., host, network device and storage device) to ensure that the infrastructure element is identified to be in compliance with a given regulation or standard maintains the appropriate security controls. For example, if a standard requires enhanced encryption for the transmission of data, the infrastructure auditor may query a given virtual infrastructure element to determine whether the appropriate level of encryption is being applied to data transmissions. Other controls installed on a virtual infrastructure element (e.g., host, network device and storage device) may also be queried by the infrastructure auditor, for example, strength of user credentials, firewalls, account creation, permissions control and/or the like.

A VM placement component 360 may receive and send messages from cloud mapping engine components. The VM placement component may determine, from the messages, one or more proper destination virtual infrastructure elements (e.g., host, network device, storage device) for a set of virtual machines (VMs) for a workload. The processing logic for the determinations made by the VM placement component is described in further detail in FIGS. 4 and 5. In one embodiment, the VM placement component may consider a security posture of given virtual infrastructure element (e.g., host, network device, storage device) when determining VM placement.

A virtual infrastructure element security posture may be characterized by the maturity, effectiveness, and completeness of the risk-adjusted security controls implemented. In one embodiment, a virtual infrastructure element (e.g., host, network device, storage device) may implement controls in one or more layers ranging from the facilities (physical security), to the network infrastructure (network security), to the IT systems (system security), to the information and applications (application security). Additionally, a virtual infrastructure element (e.g., host, network device, storage device) may implement controls at the process level for separation of duties and change management. The security responsibilities of both a cloud provider and the cloud consumer may differ between cloud service models. For example, in the IaaS model, the cloud provider is responsible for appropriate security controls up to the hypervisor. In other words, the cloud provider may address security controls such as physical security, environmental security and virtualization security. The cloud consumer may, in turn, be responsible for security controls that relate to the IT system (instance) including the security of the operating systems, applications and data.

The components of the cloud mapping engine may store information in a data store 361. A data store may be a persistent storage unit. A persistent storage unit may be a local storage unit or a remote storage unit. Persistent storage units may include a magnetic storage unit, optical storage unit and/or a solid state drive (SSD). A solid-state drive (SSD) is a data storage device that uses solid-state memory to store persistent data and provide access in the same manner of a block I/O hard disk drive. SSDs may use one or more microchips to retain data in non-volatile memory chips. In one embodiment, the workload compliance component, VM classifier, VM Placement and cloud classifier may store workload attributes, virtual machine attributes, cloud attributes to one or more databases in the data store 361. Similarly, the infrastructure inspector component, host inspector and infrastructure auditor may store information describing one or more virtual infrastructure elements to one or more databases residing in the data store.

Figure 4:
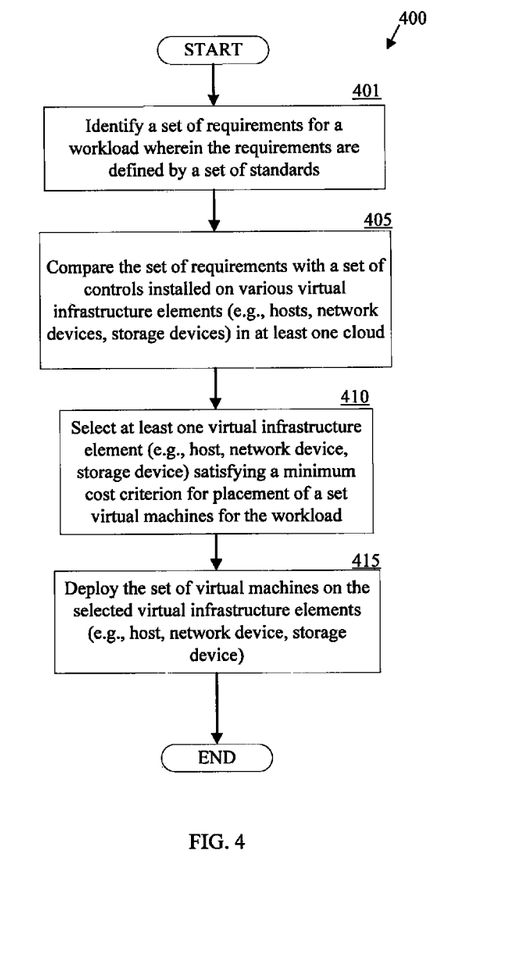
FIG. 4 illustrates one embodiment of a flow diagram in which the method for elastic (re)allocation of enterprise workloads on clouds may be performed.

FIG. 4 illustrates one embodiment of a flow diagram in which the method for elastic (re)allocation may be performed. Method 400 may be performed by processing logic that can comprise hardware (e.g., circuitry, dedicated logic, programmable logic, microcode, etc.), software (e.g., instructions run on a processing device), or a combination thereof. In one embodiment, method 300 may be performed by a cloud mapping engine, illustrated in FIG. 1 and FIG. 2.

As illustrated in FIG. 4, block 401 includes identifying a set of requirements for a workload, wherein the workload comprises one or more applications running on a set of virtual machines and the requirements are defined by a set of compliance standards. In one embodiment, identifying may include identifying a set of controls associated with a given workload. The set of requirements and/or set of controls referenced in FIG. 4 may include, for example, a set of regulatory standards, a set of industry standards, a set of legislative standards. In one embodiment, the set of requirements may include a virtual firewall, multi-factor authentication (e.g., CAPCTHA), network utility agents for monitoring traffic, application access controls, anti-virus software, patch management controls and/or the like.

In one embodiment, the set of requirements may refer to a set of controls which may further be identified as control areas. For example, a control area may be identified as a compliance control area, a data governance control area, a facility security control area, a human resource security control area, an information security control area, legal control area, operations management control area, risk management control area, software release management control area, resiliency control area and/or security architecture control area.

In one embodiment, the compliance control area may include audit planning controls, independent audit controls, contract authority maintenance controls, regulatory mapping controls and/or intellectual property controls. The data governance control area may include ownership controls, classification controls, handling security policy controls, retention policy controls, secure disposal controls, information leakage controls and/or risk assessment controls. In one embodiment, the facility control area may include policy controls, user access controls, access point controls, secure area authorization controls, off-site authorization controls, and/or asset management controls. The human resources control area may include background screening controls, employment controls and/or management program controls. The information security control area may include management support controls, policy controls, user access/restriction/authorization controls, user review controls, user training awareness controls, workspace controls, encryption controls, encryption key management controls, vulnerability controls, anti-virus controls, incident management controls, eCommerce controls, audit tool access controls, diagnostic controls, configuration port access controls, network controls, mobile controls, source code controls and/or utility program access controls. The legal control area may include non-disclosure agreement controls, third party agreement controls, and/or the like.

The operations management control area may include documentation controls, capacity controls, resource planning controls and/or equipment maintenance controls. The risk management control area may include program controls, risk assessment controls, risk mitigation controls, policy change controls and/or third party access controls. The software release management control area may include acquisition controls, production change controls, quality testing controls, outsource development controls and/or installation authorization controls. The resiliency control area may include management program controls, impact analysis controls, business continuity planning controls, continuity testing controls, environmental risk controls, equipment location controls, equipment power failure controls and/or telecommunications power controls. The security architecture control area may include customer access controls, user credential controls, data integrity controls, application security controls, remote user controls, segmentation controls, wireless access controls, shared network controls, clock synchronization controls, equipment identification controls, audit logging controls and/or mobile code controls.

The step of identifying 401 may also classify a cloud service against the cloud network model or cloud deployment model. With a classified cloud service, the method may map the security architecture of the cloud service. The mapping may produce a general security posture of a cloud service. The assurance and protection requirements resulting from the general security posture may also be propagated to the infrastructure assets of the cloud service. With reference to FIG. 2, cloud service mapping illustrates the benefit of identifying the controls for a given workload and/or virtual infrastructure element (e.g., host, network device, storage device) to determine which controls exist and which do not. These controls may be identified by a consumer specification, cloud service provider specification and/or a third party specification. The identified controls may, in turn, be compared to a compliance framework or set of requirements such as PCI DSS, as shown.

At block 405, the method may compare the set of requirements with a set of controls installed for various virtual infrastructure elements (e.g., hosts, network devices, storage devices) in at least one cloud. With reference back to FIG. 3, the comparison may be performed by components associated with the cloud mapping engine, although other components may also be used. In one embodiment, the results of these comparisons may be stored as comparison reports in data store 361 of FIG. 3.

At block 410, the method may select at least one virtual infrastructure element (e.g., host, network device, storage device) satisfying a minimum cost criterion for placement of the set of virtual machines for the workload. A cost criterion is a representation of the cost associated with allocating a workload from one or more virtual infrastructure elements (e.g., host, network device, storage device) to one or more destination virtual infrastructure element (e.g., host, network device, storage device). This cost criterion may consider the computer processing requirements, storage requirements and network access requirements of the workload. The cost criterion may also consider the availability of processing, storage and network access resources associated with one or more virtual infrastructure element (e.g., host, network device, storage device). The cost criterion may further consider the cost of transferring, installing, running, maintaining, updating, and/or auditing the candidate workload on one or more destination virtual infrastructure element (e.g., host, network device, storage device). In one embodiment, the cost criterion may consider the cost of deploying a set of security and compliance controls not currently installed on one or more destination virtual infrastructure element (e.g., host, network device, storage device).

At block 415, the method may perform the step of deploying the set of virtual machines for the workload on the selected virtual infrastructure element (e.g., host, network device, storage device). For example, the method deploys the set of virtual machines with applications having the set of requirements on the selected host, network devices and storage devices. In one embodiment, deploying the set of virtual machines may include transferring sensitive data, providing a portal interface for auditing the destination virtual infrastructure element (e.g., host, network device, storage device), providing a metering interface for monitoring data traffic and/or the like. Deploying may further include updating the set of controls installed on the destination virtual infrastructure element (e.g., host, network device, storage device) with additional controls. In one embodiment, deploying may involve tracking a regulation for changes and translating changes in the regulation to a set of installable controls for one or more virtual infrastructure elements (e.g., host, network device, storage device).

In one embodiment, the method 400 may further include provisioning a set of security controls at a set of virtual hosts for a mobile workload and automating deployment of security controls for the mobile workload. Provisioning a set of security controls may include installing, updating and/or maintaining a set of security applications, (e.g., authentication controls, encryption and/or the like). A mobile workload may include a set of applications dedicated to mobile applications, (e.g., receiving, transmitting, processing and storing data to and from mobile devices over mobile networks). In one embodiment, automating deployment of security controls for the mobile workload may include installing, updating and/or maintaining a set of security applications dedicated to mobile applications.

Figure 5:
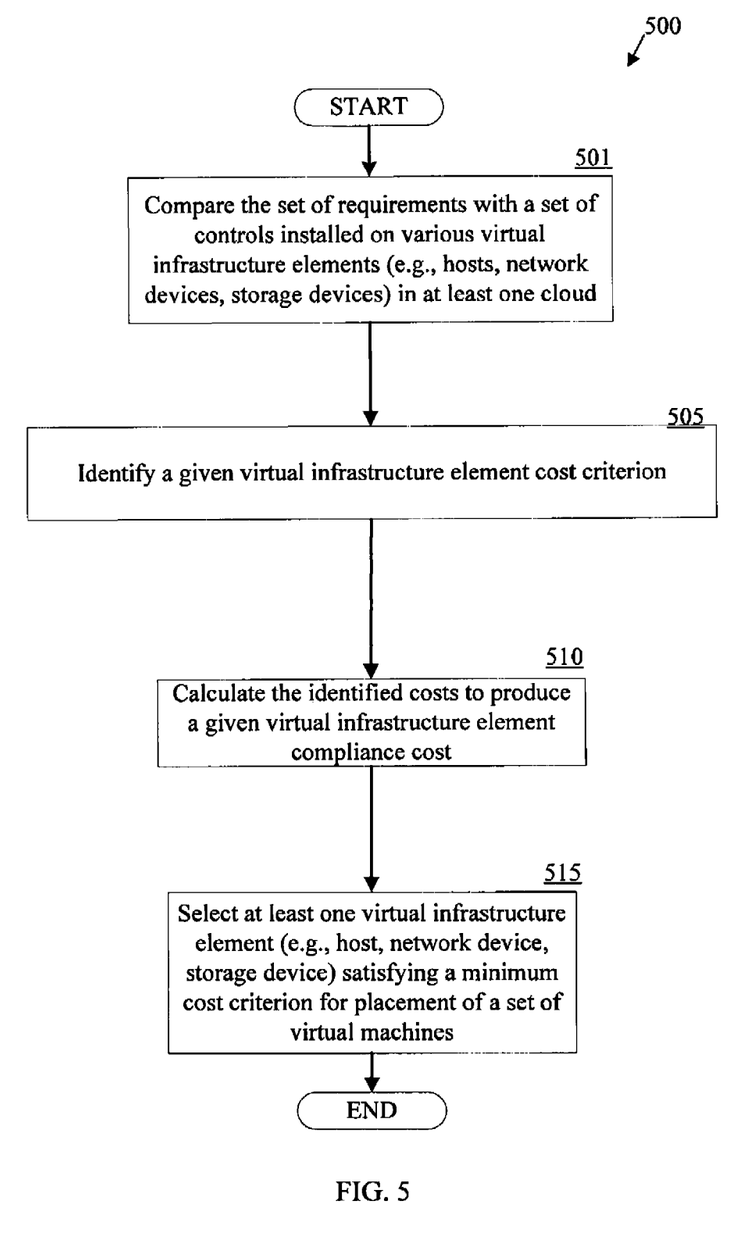
FIG. 5 illustrates one embodiment of a flow diagram in which the method for elastic (re)allocation of enterprise workloads on clouds may be performed.

FIG. 5 illustrates one embodiment of a flow diagram in which the method for elastic (re)allocation may be performed. As illustrated in FIG. 5, the method may include block 501, in which the method may compare the set of requirements with a set of controls installed on various virtual infrastructure elements (e.g., hosts, network devices, storage devices) in at least one cloud. In one embodiment, the set of requirements associated with a workload are compared with the set of controls installed on one or more virtual infrastructure elements (e.g., hosts, network devices, storage devices).

At block 505, the method may identify a given virtual infrastructure element cost criterion (e.g., host cost criterion, network cost criterion, storage cost criterion). The virtual infrastructure element cost criterion can include at least one of a host hypervisor cost, a geographic constraint associated with the given virtual infrastructure element, a virtual firewall cost associated with the given virtual infrastructure element, a network segmentation cost associated with the given virtual infrastructure element, a storage segmentation cost associated with the given virtual infrastructure element, network, host and application log management and activity monitoring costs. In one embodiment, the determination of cost may include calculating the cost of bringing an infrastructure asset into compliance, e.g. installing a specified set of utilities on one or more hosts, installing security applications on one or more hosts and networks, and/or reconfiguring existing security controls to include one or more allocated virtual machines.

At block 510, the method may calculate the identified costs to produce a given virtual infrastructure element compliance cost. In one embodiment, the given virtual infrastructure element compliance cost may include a representation of the cost of deploying a set of controls on a given virtual infrastructure element (e.g., host, network device, storage device) based on the set of requirements for a workload. The given virtual infrastructure element compliance cost may be used by the cloud mapping engine and associated components to rank one or more virtual infrastructure elements (e.g., hosts, network devices, storage devices) by their respective compliance cost.

At block 515, the method may perform selecting at least one virtual infrastructure element (e.g., hosts, network devices, storage devices) satisfying a minimum cost criterion for placement of a set of virtual machines. In one embodiment, the cloud mapping engine and associated components may compare one or more virtual infrastructure elements (e.g., hosts, network devices, storage devices) satisfying a minimum cost criterion. A minimum cost criterion may be represented as a combination of computational/processing costs, storage costs, and/or bandwidth costs associated with a given virtual infrastructure element. In one embodiment, the selection of at least one virtual infrastructure element satisfying a minimum cost criterion may be the virtual infrastructure element (e.g., host, network device, storage device) with the lowest computational, storage and/or bandwidth costs. The selection of at least one virtual infrastructure element may also consider the geographical location of one or more virtual infrastructure elements and attribute a lower cost to virtual infrastructure elements closer to a given geographical location or zone.

Figure 6:
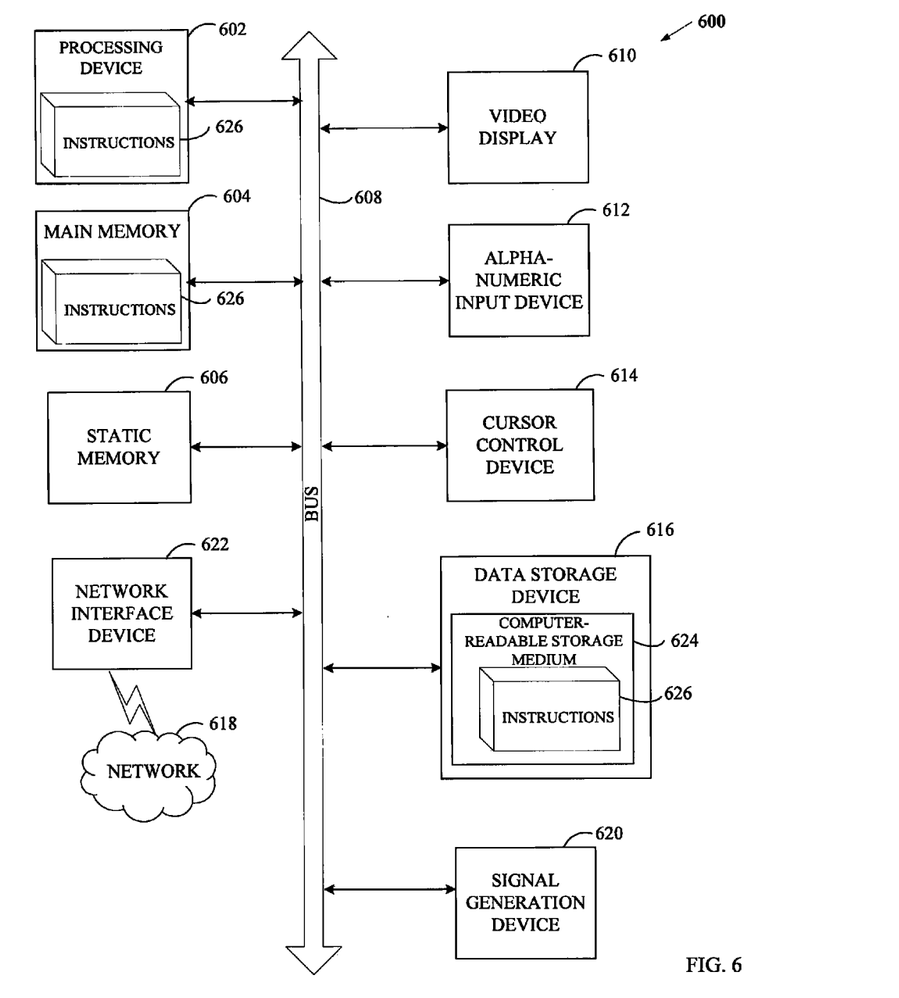
FIG. 6 illustrates one embodiment of a computer system on which the elastic (re)allocation of enterprise workloads on clouds may operate.

FIG. 6 illustrates one embodiment of a system on which the elastic (re)allocation of enterprise workloads on clouds may operate. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Processing device 602 represents one or more general-purpose processing devices such as a microprocessor, hardware processor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media. The instructions 626 may further be transmitted or received over a network 518 via the network interface device 622.

The computer-readable storage medium 624 may also be used to store the instructions 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 626, components and other features described herein (for example in relation to FIG. 3) can be implemented as discrete hardware components or integrated in the functionality of hardware components such as ASICS, FPGAs, DSPs or similar devices. In addition, the instructions 626 can be implemented as firmware or functional circuitry within hardware devices. Further, the instructions 626 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying," "comparing," "selecting," "deploying," "calculating," "provisioning," "automating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for elastic (re)allocation of enterprise workloads on clouds is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    identifying a set of requirements for a workload, wherein the workload comprises one or more applications to run on a set of virtual machines;
    identifying a plurality of virtual infrastructure elements in a cloud using the set of requirements;
    identifying one or more cost criteria associated with the set of requirements, the set of requirements being defined by a set of compliance standards;
    selecting one or more of the plurality of virtual infrastructure elements satisfying the one or more cost criteria, wherein the one or more virtual infrastructure elements comprises at least one of one or more hosts, one or more network devices, or one or more storage devices; and
    deploying the set of virtual machines for the workload using the one or more virtual infrastructure elements.

2. The method of claim 1, wherein the set of requirements comprises a virtual firewall.

3. The method of claim 1, wherein the set of requirements comprises a data loss prevention gateway configured to scan outbound traffic.

4. The method of claim 1, wherein the set of compliance standards are regulatory standards.

5. The method of claim 1, wherein identifying the plurality of virtual infrastructure elements comprises:
    identifying a set of controls installed on the plurality of virtual infrastructure elements, the set of controls comprising at least one a hypervisor security control, a storage security control, or a virtual firewall control.

6. The method of claim 1, wherein selecting the one or more virtual infrastructure elements satisfying the one or more cost criteria comprises:
    identifying a cost criterion associated with a virtual infrastructure element, the cost criterion comprising at least one of a host hypervisor cost, a geographic cost associated with the virtual infrastructure element, a virtual firewall cost associated with the virtual infrastructure element, a network segmentation cost associated with the virtual infrastructure element, or a storage segmentation cost associated with the virtual infrastructure element; and
    calculating the cost to bring the virtual infrastructure element in compliance with set of requirements.

7. The method of claim 1, further comprising:
    provisioning a set of security controls at a virtual host for a mobile workload; and
    automating deployment of security controls for the mobile workload.

8. A system comprising:
    a memory; and
    a processing device coupled with the memory to:
        identify a set of requirements for a workload, wherein a workload comprises applications to run on a set of virtual machines;
        identify a plurality of virtual infrastructure elements in a cloud using the set of requirements;
        identify one or more cost criteria associated with the set of requirements, the set of requirements being defined by a set of compliance standards;
        select one or more of the plurality of virtual infrastructure elements satisfying the one or more cost criteria, wherein the one or more virtual infrastructure elements comprises at least one of one or more hosts, one or more network devices, or one or more storage devices; and
        deploy the set of virtual machines for the workload using the one or more virtual infrastructure elements.

9. The system of claim 8, wherein the set of requirements comprises a virtual firewall.

10. The system of claim 8, wherein the set of requirements comprises a data loss prevention gateway configured to scan outbound traffic.

11. The system of claim 8, wherein the set of compliance standards are regulatory standards.

12. The system of claim 8, wherein the processing device is further to:
    identify an infrastructure asset configuration comprising at least one hypervisor security compliance check, a storage security compliance check, or a virtual firewall compliance check.

13. The system of claim 8, wherein the processing device is further to:
    identify a cost criterion associated with a virtual infrastructure element, the cost criterion comprising at least one of a host hypervisor cost, a geographic cost associated with the virtual infrastructure element, a virtual firewall cost associated with the virtual infrastructure element, a network segmentation cost associated with the virtual infrastructure element, a storage segmentation cost associated with the virtual infrastructure element; and
    calculate the cost to bring the virtual infrastructure element in compliance with the set of requirements.

14. The system of claim 8, wherein the processing device is further to:
    provision a set of security controls at a virtual host for a mobile workload; and
    automate deployment of security controls for the mobile workload.

15. A non-transitory computer readable storage medium including instructions that, when executed by a processing device, cause the processing device to:
    identify a set of requirements for a workload, wherein the workload comprises applications to run on a set of virtual machines;
    identify a plurality of virtual infrastructure elements in a cloud using the set of requirements;
    identify one or more cost criteria associated with the set of requirements, the set of requirements being defined by a set of compliance standards;
    select one or more of the plurality of virtual infrastructure elements satisfying the one or more cost criteria, wherein the one or more virtual infrastructure elements comprises at least one of one or more hosts, one or more network devices, or one or more storage devices; and
    deploy the set of virtual machines for the workload using the one or more virtual infrastructure elements.

16. The medium of claim 15, wherein the set of requirements comprises a virtual firewall.

17. The medium claim 15, wherein the set of requirements comprises a data loss prevention gateway configured to scan outbound traffic.

18. The medium of claim 15, further including instructions that, when executed by the processing device, cause the processing device to:
   identify an infrastructure asset configuration comprising at least one hypervisor security compliance check, a storage security compliance check, or a virtual firewall compliance check.

19. The medium of claim 15, further including instructions that cause the processing device to:
   identify a cost criterion associated with a virtual infrastructure element, the given virtual infrastructure element cost criterion comprising at least one of a host hypervisor cost associated with a host, a geographic cost associated with the virtual infrastructure element, a virtual firewall cost associated with the virtual infrastructure element, a network segmentation cost associated with the virtual infrastructure element, or a storage segmentation cost associated with the virtual infrastructure element; and
   calculate the cost to bring the virtual infrastructure element in compliance with the set of requirements.

20. The medium of claim 19, wherein the instructions, further includes instructions that cause the processing device to:
   provision a set of security controls at a virtual host for a mobile workload; and
   automate deployment of security controls for the mobile workload.

* * * * *